E. A. FRANTZ.
BUCKLE MAKING MACHINE.
APPLICATION FILED MAY 31, 1911.

1,034,007.

Patented July 30, 1912.
5 SHEETS—SHEET 1.

Witnesses

E. A. Frantz,
Inventor by C. A. Snow & Co.
Attorneys

E. A. FRANTZ.
BUCKLE MAKING MACHINE.
APPLICATION FILED MAY 31, 1911.

1,034,007.

Patented July 30, 1912.

5 SHEETS—SHEET 2.

Witnesses

E. A. Frantz,
Inventor by

Attorneys

E. A. FRANTZ.
BUCKLE MAKING MACHINE.
APPLICATION FILED MAY 31, 1911.

1,034,007.

Patented July 30, 1912.
5 SHEETS—SHEET 4.

Fig. 5.

E. A. Frantz,
Inventor

Witnesses by C. A. Snow & Co.
Attorneys

E. A. FRANTZ.
BUCKLE MAKING MACHINE.
APPLICATION FILED MAY 31, 1911.

1,034,007.

Patented July 30, 1912.

5 SHEETS—SHEET 5.

Witnesses
J. F. Towers
L. H. Wilson

E. A. Frantz,
Inventor by C. A. Snow & Co.
Attorneys

COLUMBIA PLANOGRAPH CO., WASHINGTON, D. C.

UNITED STATES PATENT OFFICE.

EZRA A. FRANTZ, OF WEATHERFORD, TEXAS, ASSIGNOR TO FRANTZ BUCKLE CO., OF WEATHERFORD, TEXAS.

BUCKLE-MAKING MACHINE.

1,034,007. Specification of Letters Patent. Patented July 30, 1912.

Application filed May 31, 1911. Serial No. 630,517.

*To all whom it may concern:*

Be it known that I, EZRA A. FRANTZ, a citizen of the United States, residing at Weatherford, in the county of Parker and State of Texas, have invented a new and useful Buckle-Making Machine, of which the following is a specification.

This invention relates to an improvement in buckle making machines, the primary object of the invention being the provision of a machine for cutting and forming lengths of wire into buckles, especially for use as bale tie buckles, said machine having wire straightening and feeding means combined with the cam operated mechanisms connected and operated in train, or synchronism, with the said means to cut the wire into lengths and bend the same to form the buckle, and finally to eject the buckle from the machine.

A further object of the invention is the provision of peculiar means for co-acting to form the various bends of the buckle, so that when the article is completed it will be ejected from the machine and the parts assume the position for forming a succeeding buckle.

A still further object of this invention is the provision of a series of co-acting forming dies or punches for receiving the free end of the wire, which is stopped at the forming portion of the machine, and is cut prior to forming, the said cutting mechanism forming an auxiliary stop in combination with the wire feed, to hold the bulk of the wire in stationary position, while the dies or punches are operated in train to form the buckle from the severed wire.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
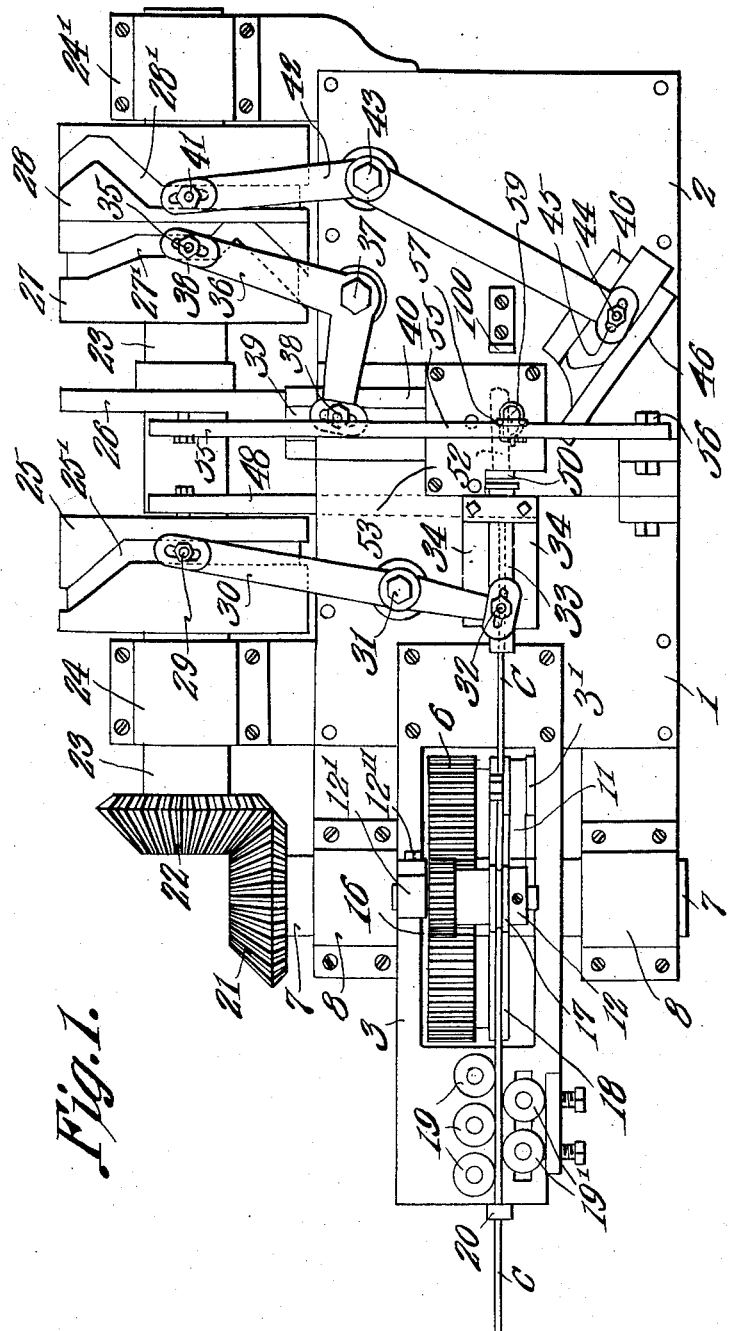
Figure 2:
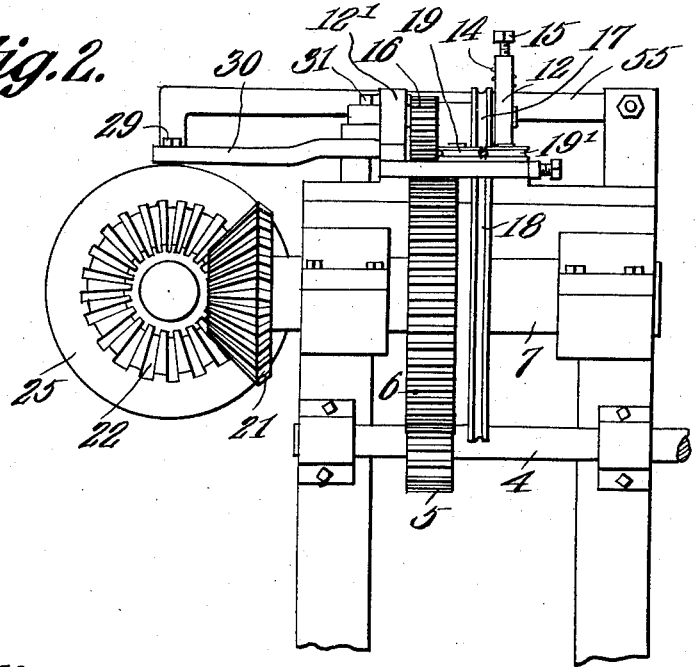
Figure 3:
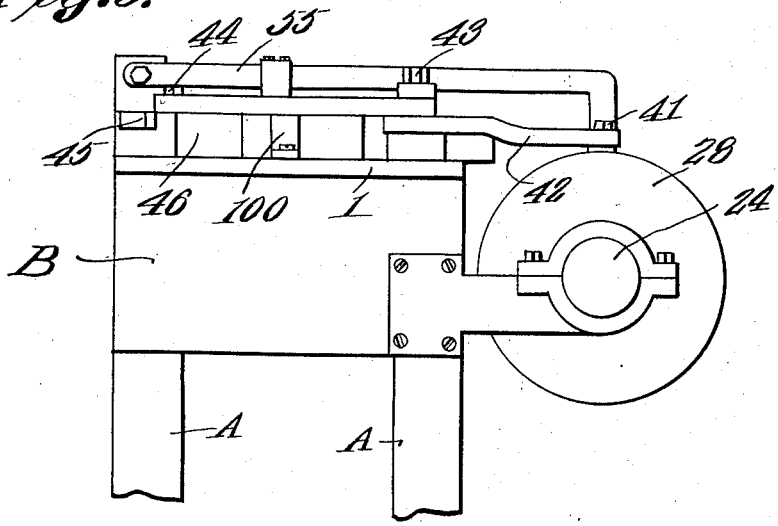
Figure 4:
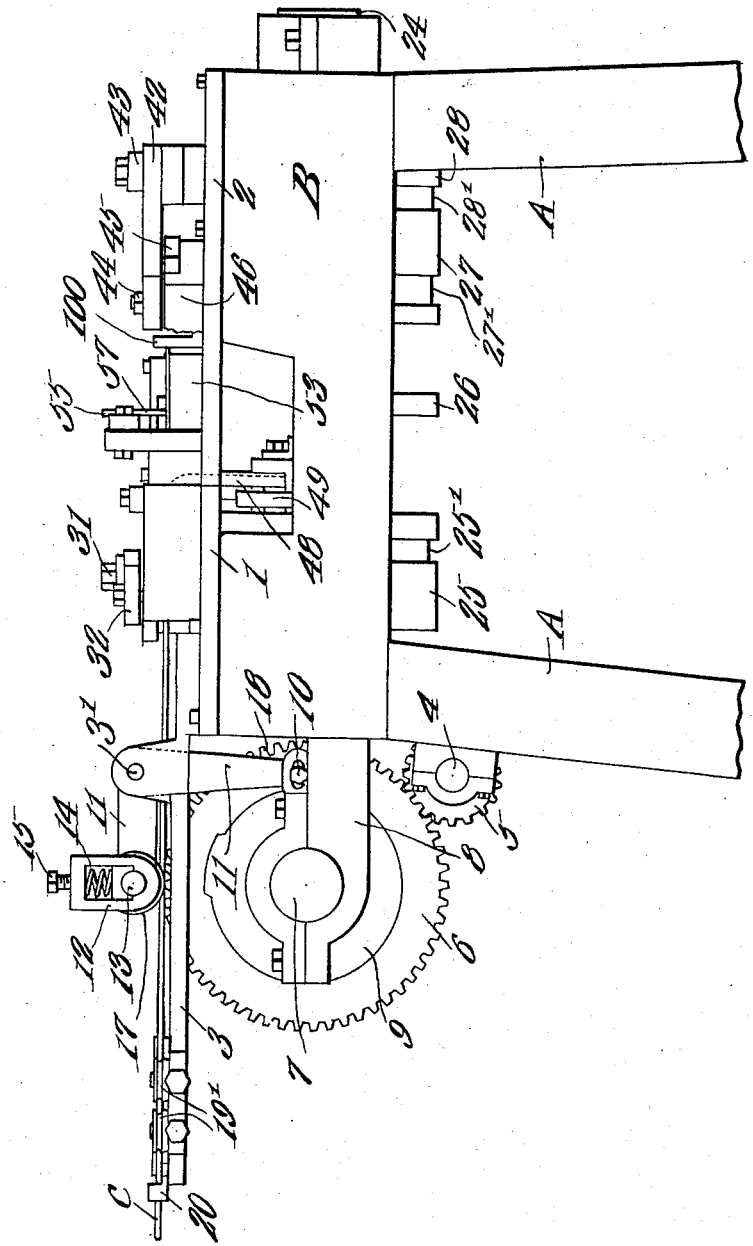
Figure 7:
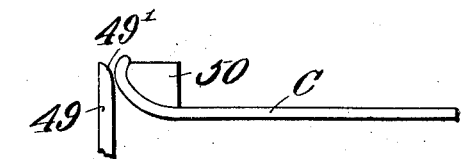
Figure 11:
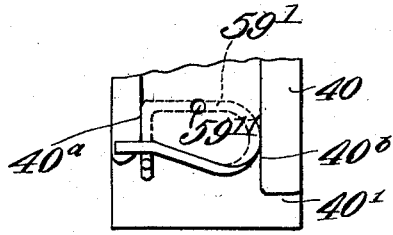
Figure 8:
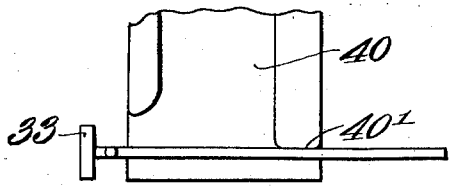
Figure 12:
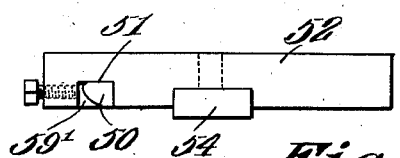
Figure 9:
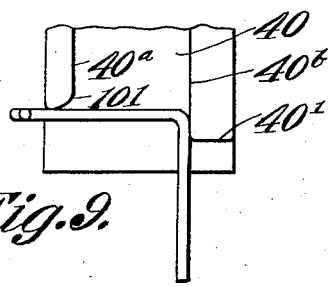
Figure 6:
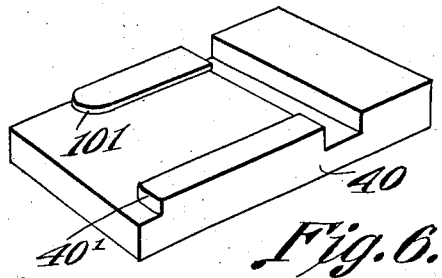
Figure 10:
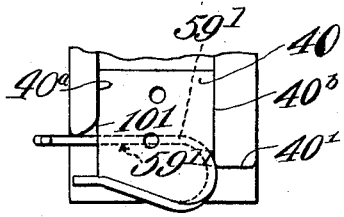
Figure 13:
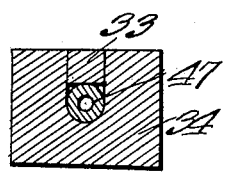

In the drawings: Figure 1 is a top plan view of the complete machine. Fig. 2 is a front view of the machine. Fig. 3 is a rear elevation of the machine. Fig. 4 is a side view taken from the right side of the machine. Fig. 5 is a similar view from the left side of the machine. Fig. 6 is a perspective view of the sliding punch which is one member of the buckle forming portion of the machine. Fig. 7 illustrates the first step in forming the buckle, or the cutting of the wire, and the bending of one end thereof. Fig. 8 illustrates the second step in forming the buckle. Fig. 9 illustrates the third step. Fig. 10 illustrates the fourth step. Fig. 11 illustrates the fifth step, the buckle having been formed with the dies in the position just prior to the final ejection of the buckle. Fig. 12 is a detail view of the plate holding the means that form the first bend at the cut-off end of the buckle stock. Fig. 13 is a cross section on line 13—13 of Fig. 1.

Referring to the drawings, A designates the supporting legs of the machine which carry the frame B, to which are connected the plates 1 and 2 forming the top or table of the machine. Connected to and carried by the plate 2 is a plate or bracket 3, the purpose of which will presently appear.

Journaled upon two of the legs of the machine is a transverse drive or counter shaft 4, which receives its power from any desired source, and through its small gear or pinion 5 transmits motion to the large gear 6 keyed to the shaft 7 journaled in the brackets or arms 8, said gear being provided upon one face thereof with a cam slot 9 which is normally in engagement with the pin 10 carried upon the lower free end of the bell-crank lever 11, journaled or fulcrumed at 3′ to the plate 3 of the machine. Carried in the other arm of the bell-crank lever 11 is a frame 12 in which is mounted the shaft 13, held cushionedly in said frame 12 by means of the coiled spring 14 whose tension is adjusted by means of the screw 15. The other frame 12′ is provided with a screw 12″ upon which the frames 12 and 12′ are permitted to rock and limit the downward movement of the small gear 16, which receives its motion from the large gear 6 and thereby operates the upper wire feeding and grooved wheel 17, which co-acts with the large grooved wire feeding wheel 18 carried by the gear 6.

The wire C is first fed through the guide 20 between the straightening rollers 19 and 19′, the shafts of the rollers 19 being stationarily mounted so that they retain the rollers in the same alinement, while the shafts of the rollers 19′ are mounted adjustably with relation to, and from, the shafts of the rollers 19, whereby various diametered wire may be straightened and fed between the two co-acting feed rollers 17 and 18. The wire is fed through the channel or bore 33' of the boss 34, and through the hardened sleeve or tube 47 whose outer end forms the stationary blade of the wire severing means, the wire being limited in its feed or projection by means of the stop 100 mounted beyond the wire bending and buckle forming portion of the machine.

Mounted upon the inner end of the shaft 7 is a bevel gear 21, which meshes with the bevel gear 22 and thereby transmits motion to the shaft 23, which is journaled in the boxes or brackets 24 and 24' and has keyed thereon, between the said brackets, the cams 25, 26, 27 and 28, respectively. The cam 25 is provided with the cam groove 25' in which slides and is operated the pin 29 of the straight lever 30, which is pivoted at 31 to the plate 2 and carries in its inner free end the pin 32 in turn connected to the punch or die 33, which is termed the hook finishing punch or die, and is given a longitudinally reciprocating movement of the machine. The cam 27 is provided with a cam groove 27', in which slides and is operated the pin 35 carried by the outer end of the bell-crank lever 36, which is pivoted or fulcrumed at 37 to the plate 2 and carries the pin 38 which connects the bell crank lever 36 to the rear end 39 of the sliding punch, die or wire folder 40, which is thereby given a movement transversely of the machine or at right angles to and just beyond the punch or die 33. The exact purpose of this die and folder will presently appear. The cam 28 is provided with the cam groove or slot 28' in which is slidably mounted the pin 41 of the bent lever 42, which is pivoted or fulcrumed intermediate of its ends to the plate 2 as at 43 and is connected by the pin and slot 44 to the punch or die 45, slidably mounted in the slotted guide plate 46 mounted upon the plate 2 in such a position as to properly guide the said punch or die 45 into and out of operating position with the punch or die 40, this punch or die 45, as shown, moving in an angular direction to and from the co-acting punches or dies 33 and 40, as will presently appear.

Operably connected to one face of the cam 25 is the outer end of the lever 48 which is pivoted to the underside of the plate 2 and carries at its inner free end the vertically movable wire cutting knife 49, said knife being moved upwardly just after the wire has been fed and abuts the stop 100, so that the said knife 49 will co-act with the inner end of the tube or stationary knife 47, to sever the length of wire, the curved portion 49' of said knife in its travel upwardly, abutting the cut or severed end of the short piece of wire and bending the end upwardly against the former or anvil 50 carried stationarily in the plate 52 (Fig. 12) mounted in the support 53 carried by the plate 2. This hook bar former, or anvil 50 is held by the plate 52 which also carries the former pin or bar 54, the purposes of which will presently appear.

In order to eject the completed buckle from the machine, the lever 55, which is operated by the cam 36, is pivoted at 56 to the plate 2 and carries intermediate of its ends, at the buckle forming position of the machine, the buckle ejector 57, which straddles the stationary loop former or die 59 that is secured to the frame and projects above the buckle discharging opening 57' and is adapted to co-act with the shoulder 40' of the punch or die 40, which slides upon said former or die 59 and the transverse slot 59'' of the loop former or die 59, to form the buckle and eject the completed article from the machine, the other member of the ejector 57 passing by the end of the loop former or die 59, as illustrated in Fig. 10.

From the foregoing description taken in connection with the drawings, the operation of this buckle forming machine is readily understood, but briefly stated, it is as follows:—The wire is first fed through the guide 20 and straightening rollers 19 and 19', and between the feeding rollers 17 and 18 which receive their motion from the shaft 7 as the rollers 17 and 18 are rotated, the wire is pulled through the straightening devices and pushed through the stationary knife and guiding tube 47 across the buckle forming portion of the machine through the slot 59' of the loop forming block 59 above the opening 57' of the frame and below the projecting end of the stationary loop former or die 59 to abut the stop 100, the portion of the wire within the slot 59', being held against downward displacement by means of the projecting end of the punch or die 40, slidably mounted below and with relation to the loop former or die 59. By means of the cam 9 and the bell-crank lever 11, the bell-crank lever is operated to raise the roller 17 from contact with the wire on roller 18, thus stopping the feed of the wire after it is in buckle forming position. At this stage, the movable knife 49 is moved upwardly, severing the wire exterior of the outer end of the stationary knife 47, and having its curved portion brought upwardly to co-act with the former or anvil 50 to bend the inner end of the wire to first forming position (Figs. 7 and 8). This action produces an upwardly and slightly outwardly bent terminal adjacent the tube 47 and slightly above the face of the former or anvil 50, the punch or die 33 being moved away from the tube 47 at this juncture and striking the terminal of the cut blank and moving it toward and upon the former or anvil 50 to complete the hooked terminal of the article. When the wire is in the position just before severing, it rests within the slot 59' of the loop former, and after the bending of the end of the wire, as bent by the movable knife 49 and the punch or die 33, as described, the punch or die 40 is moved so as to bend the severed piece of wire into an L-shape (Fig. 9), the shoulder 40' and former or die 59, accomplishing this, the former or die 40 at this period being halted momentarily, while the punch or die 45 is operated to bend the extended end or free terminal of the L-shaped blank against the outer end of the former or die 59 to the position as shown in Fig. 10, the inclined or cam groove 45', in the end of the obliquely moved punch or die 45, spanning the blank and imparting thereto a slight upward movement and consequent bend, so that this terminal will be placed in a plane above the portion adjacent the hooked terminal, as particularly shown in Fig. 11. At this juncture, the punch or die 40 is again moved, and a continued movement of the punch or die 40 pushes the piece of wire between the two parallel strips 40ª and 40ᵇ of the punch or die 40 (Figs. 10 and 11), and forms the same in the shape as shown in Fig. 11, the buckle being complete and now ready for removal from the machine. Upon the recession of the punches or dies 33, 40 and 45, the ejector 57 is operated by its cam 26 and lever 55, and the completed buckle is ejected from the buckle forming portion of the machine, through the opening 57' therein, and the parts are again set in motion to feed the next section or length of wire to buckle forming position.

What is claimed is:—

1. In a machine of this character, the combination with wire feeding mechanism, of severing mechanism for the wire, means operating at right angles and across the path of the feeding mechanism to bend the wire, means operating from the direction of and in the path of the feeding mechanism to also bend the wire, a final buckle forming mechanism operating at an angle from the opposite side of the movements of the two bending mechanisms, and means for operating the feeding, bending and forming mechanisms in train.

2. In a machine of this character, the combination with wire feeding mechanism, of severing mechanism for the wire, a wire bending mechanism at right angles to the path of feed of the wire, another bending mechanism from and in the direction of the wire feed, a final bending mechanism operating toward the point of junction of the other bending mechanisms, an ejecting mechanism to eject the complete buckle from the machine, and means for operating the various mechanisms in train.

3. In a machine of this character, the combination with a wire feeding mechanism, of means for severing the wire into predetermined lengths and bending the severed end, a wire bending mechanism operating at right angles to the path of feed, an intermediate bending mechanism operating in the path of feed to bend said bent up end, a final forming mechanism acting in conjunction with the other bending mechanisms to form a buckle, and means for operating the various mechanisms in train.

4. In a machine of this character, the combination with a wire feeding mechanism, of means for severing the wire into predetermined lengths and bending the severed end, a wire bending mechanism operating at right angles to the path of feed, an intermediate bending mechanism to bend up the bent end of the wire and operating in the path of the feed, a final forming mechanism to act in conjunction with the other bending mechanism to form a buckle, means to eject the formed buckle from the machine, and means to operate all of the various mechanisms in train.

In testimony that I claim the foregoing as my own, I have hereto affixed my signature in the presence of two witnesses.

EZRA A. FRANTZ.

Witnesses:
S. P. Owens,
J. C. Owens.

---

Copies of this patent may be obtained for five cents each, by addressing the "Commissioner of Patents, Washington, D. C."